United States Patent [19]

Inoue et al.

[11] Patent Number: 5,518,642
[45] Date of Patent: May 21, 1996

[54] OXIDE MAGNETIC MATERIAL

[75] Inventors: Osamu Inoue; Nobuya Matsutani; Koichi Kugimiya; Osamu Ishii; Yasuyuki Aono, all of Osaka, Japan

[73] Assignee: Matsushita Electric Industrial Co., Ltd., Kadoma, Japan

[21] Appl. No.: 314,546

[22] Filed: Sep. 28, 1994

Related U.S. Application Data

[63] Continuation of Ser. No. 3,134, Jan. 12, 1993, abandoned.

[30] Foreign Application Priority Data

| Jan. 14, 1992 | [JP] | Japan | 4-005227 |
| May 20, 1992 | [JP] | Japan | 4-127079 |
| Jun. 1, 1992 | [JP] | Japan | 4-140225 |
| Sep. 7, 1992 | [JP] | Japan | 4-237874 |
| Oct. 7, 1992 | [JP] | Japan | 4-268501 |

[51] Int. Cl.$^6$ .................................................. C04B 35/38
[52] U.S. Cl. ................... 752/62.56; 252/62.62; 252/62.57; 252/62.58; 252/62.59
[58] Field of Search ................ 252/62.59, 62.57, 252/62.58, 62.56, 62.62

[56] References Cited

U.S. PATENT DOCUMENTS

| 3,415,751 | 12/1968 | Hirota et al. | 252/62.59 |
| 3,481,876 | 12/1969 | Hiraga et al. | 252/62.62 |
| 3,652,416 | 3/1972 | Sugano et al. | 252/62.62 |
| 3,655,841 | 4/1972 | Akashi et al. | 252/62.62 |
| 3,769,219 | 10/1973 | Sugana et al. | 252/62.56 |
| 5,143,638 | 9/1992 | Yamazaki et al. | 252/62.59 |

FOREIGN PATENT DOCUMENTS

| 0460215 | 12/1991 | European Pat. Off. . |
| 460215 | 12/1991 | European Pat. Off. . |
| 1302342 | 2/1971 | Germany . |
| 2022778 | 3/1971 | Germany . |
| 56-069274 | 1/1981 | Japan . |
| 58-036974 | 4/1983 | Japan . |
| 60-137830 | 7/1985 | Japan . |
| 60-262404 | 12/1985 | Japan . |
| 60-262405 | 12/1985 | Japan . |
| 61-101458 | 5/1986 | Japan . |
| 61-256967 | 11/1986 | Japan . |
| 1224265 | 9/1989 | Japan . |
| 1-224265 | 9/1989 | Japan . |
| 2220935 | 7/1989 | United Kingdom . |

OTHER PUBLICATIONS

Okutani, J. Jpn. Soc. Powder and Powder Metallugry, vol. 34, No. 5, pp. 189–197, (1987). No Month.
Ohta, Journal of the Physical Society of Japan, vol. 18, No. 5, May, 1963, pp. 685–690.
Okamoto et al., Electronic Ceramics, vol. 16(73), 1985 Winer, pp. 41–49. No Month.

*Primary Examiner*—Melissa Bonner
*Attorney, Agent, or Firm*—Renner, Otto, Boisselle & Sklar

[57] ABSTRACT

An oxide magnetic material provided by the present invention contains, as main components, 55 to 59 mol % of $Fe_2O_3$; 35 to 42 mol % of MnO; and 6 mol % or less of ZnO, and further contains, as sub-components, 0.05 to 0.3 wt % of CaO; and 0.005 to 0.05 wt % of $SiO_2$. The other oxide magnetic material provided by the present invention contains, as main components, 61 to 67 mol % of $Fe_2O_3$; 3 to 36 mol % of MnO; and 30 mol % or less of ZnO, and further contains, as sub-components, 0.05 to 0.5 wt % of CaO; and 0.005 to 0.2 wt % of $SiO_2$. Such materials can further contain one or more kinds of oxides selected from the group consisting of $ZrO_2$, $HfO_2$, $Ta_2O_5$, $Cr_2O_3$, $MoO_3$, $WO_3$, $Al_2O_3$, $Ga_2O_3$, $In_2O_3$, $GeO_2$, $SnO_2$, $Sb_2O_3$ and $Bi_2O_3$. Such magnetic materials of the present invention have the advantages of having an extremely low magnetic loss even when used in the high frequency band and having a minimum magnetic loss at a temperature sufficiently higher than room temperature. Moreover, a switching power supply having a switching frequency of 300 kHz to 5 MHz is provided by using such magnetic materials as a magnetic core.

10 Claims, 2 Drawing Sheets

OXIDE MAGNETIC MATERIAL

This is a continuation of application Ser. No. 08/003,134 filed on Jan. 12, 1993, now abandoned.

BACKGROUND OF THE INVENTION

1. Field of the Invention

The present invention relates to a magnetic material. More particularly, it relates to a ferrite type magnetic material having a low magnetic loss when used in a high frequency band.

2. Description of the Related Art

As electronic technique has been developed recent years, electronic apparatuses have not only become compact and of high density but have become also begun to be used at a higher frequency for improving their efficiencies. For example, a magnetic material used in a magnetic core of a converter in a switching power supply, an inductance component and the like have been required to be compact as well as to be applied for use at a higher frequency. Such a material which has a low magnetic loss when used in a high frequency band has been desired so as to prevent heat generation caused especially in a compact apparatus.

As an example of the prior art, magnetic materials used in a magnetic core and the like will now be described. The magnetic materials are categorized into two major types, metal type materials and oxide ferrite type materials. The metal type materials have advantages of having a high saturation magnetic flux density and a high magnetic permeability. But they have a disadvantage that magnetic loss due to an eddy current is increased when used in the high frequency band since they have a low electric resistivity of about $10^{-6}$ to $10^{-4}$ $\Omega \cdot cm$. As this disadvantage can be overcome by making the magnetic material thin, a metal is shaped into a thin foil and rolled up together with an insulator placed thereon. However, the lower limit of the thickness of the metal type materials is about 10 μm, which is also the lower limit in the above-mentioned reduction of an eddy current. Moreover, the metal type materials are disadvantageously difficult to be formed into complicated shapes and expensive. Thus, such materials can not be used in a frequency bend over 100 kHz.

Alternatively, the ferrite type materials have a low saturation magnetic flux density of about a half of that of the metal type materials. However, the electric resistivity thereof is much higher than that of the metal type materials: for example, a generally used MnZn type ferrite has an electric resistivity of about 1 $\Omega \cdot cm$. Moreover, the electric resistivity can be further increased up to about 10 to several hundreds $\Omega \cdot cm$ by adding CaO, $SiO_2$ and the like. As a result, the magnetic loss due to an eddy current is small and such materials can be used in a relatively high frequency band. In addition, the ferrite type materials have advantages that they can be easily formed into complicated shapes and are inexpensive. Therefore, the ferrite type materials have been generally used in a magnetic core of a converter in a power supply that is used at a switching frequency of, for example, 100 kHz or more and 500 kHz or less.

However, the ferrite type materials can not be used at a frequency of 500 kMz or more because the magnetic loss due to an eddy current is increased at such a high frequency.

When the temperature coefficient of the magnetic loss is positive at around room temperature, the magnetic core emits heat due to the magnetic loss while in use, resulting in a raised temperature. As the temperature rises, the magnetic loss is further increased to make the magnetic core emit more heat. This cycle is repeated, and as a result, a thermorunaway may occur. Therefore, the ferrite type materials need to have a temperature characteristic that the temperature coefficient of the magnetic loss is negative at around room temperature and the magnetic loss is minimized at a temperature where the ferrite type materials are actually used, that is, from room temperature to 80° C. At present, there is no MnZn type ferrite type material that has a sufficiently low magnetic loss when used in a high frequency band. For example, a conventional MnZn type ferrite has a magnetic loss of 1000 $kW/m^3$ or more when used at a frequency of 1 MHz. Moreover, materials which have a comparatively low magnetic loss when used in the high frequency band generally have a bottom temperature of a magnetic loss around room temperature and the temperature coefficient thereof is positive. Thus, a thermorunaway can be easily caused. On the contrary, materials which have a bottom temperature of a magnetic loss over room temperature when used in the high frequency band have a very large magnetic loss. Thus, a material having an extremely low magnetic loss when used in the high frequency band and having a bottom temperature of a magnetic loss sufficiently higher than room temperature has not been provided at the present time. The temperature at which a material has a minimum magnetic loss is referred to as the "bottom temperature of a magnetic loss" hereinafter.

Among magnetic characteristics of a ferrite, characteristics such as the saturation magnetic flux density, the Curie temperature and the bottom temperature of the magnetic loss generally depend upon the composition of main components. Characteristics each as the magnetic permeability, a residual magnetic flux density, a coercive force and the magnetic loss depend also upon the composition of main components but mainly depend upon the fine structure of the ferrite. Any MnZn type ferrite having a low magnetic loss when used in the high frequency band is required to be high in saturation magnetic flux density, the Curie temperature, the bottom temperature of a magnetic loss and the magnetic permeability (K. Okutani, *J. Jpn. Soc. Powder and Powder Metallurgy*, 34, (5), p. 191 (1987)).

For example, the saturation magnetic flux density of the MnZn type ferrite is increased when a specific amount of ZnO and a large amount of $Fe_2O_3$ are contained therein. However, when the amount of ZnO is too large, the Curie temperature is disadvantageously decreased. In addition, it is known that the magnetic permeability and the electric resistivity is decreased when the amount of $Fe_2O_3$ is too large. The electric resistivity is decreased because the $Fe_2O_3$ exceeding 50 mol % is changed into FeO, thereby causing an electron hopping between $Fe^{2+}$ and $Fe^{3+}$. Therefore, as the amount of $Fe_2O_3$ exceeds 50 mol %, the electric resistivity is decreased. This decrease in the electric resistivity is lowered to some extent by using an appropriate additive or the like. But the thus decreased electric resistivity is still large in comparison with that of a conductive material with a main component originally having a high electric resistivity and comprising an appropriate additive. This decrease of the electric resistivity causes an increase of the magnetic loss due to an eddy current. Therefore, it has been believed that a composition including a large amount of $Fe_2O_3$ can not be used in the high frequency band.

For example, Japanese Laid-Open Patent Publication No. 61-101458 discloses a MnZn type ferrite comprising 52 to 58 mol % of $Fe_2O_3$, 7 mol % or less of ZnO and 35 to 48 mol % of MnO as main components, and 0.01 to 0.2 wt % of CaO and optionally 0.1 wt % or less of $SiO_2$ as subcomponents. This ferrite can be used at a frequency of 100 kHz.

The bottom temperature of a magnetic loss has been considered to depend upon a temperature characteristic of the magnetic permeability. When the MnZn type ferrite is measured for its magnetic permeability against a certain temperature, two peaks are generally obtained. One is a peak at the Curie temperature, which is called a primary peek due to the Hopkinson effect. The other is a peak at around room temperature, which is called a secondary peak. At the temperature of this secondary peak, the crystallomagnetic anisotropic coefficient $K_1$ is 0. It has been believed that the magnetic loss is a minimal at this temperature.

The crystallomagnetic anisotropic coefficient $K_1$ is linearly increased as the temperature rises. When $K_1$ is negative at room temperature, $K_1$ is 0 over room temperature. When a composition having such a coefficient is used, the bottom temperature of a magnetic loss can be set over room temperature. K. Ohta, *J. Phys. Soc. Japan,* 18, p. 684 (1963) describes a change of $K_1$ obtained by varying a composition ratio of the, main components of the Mn/Zn type ferrite. $K_1$ is slightly affected by the Mn/Zn ratio. $K_1$ is positive and maximum at room temperature when the ferrite contains about 60 mol % of $Fe_2O_3$. $K_1$ is decreased when the ferrite contains less or more $Fe_2O_3$. When the ferrite contains about 55 mol % or less of $Fe_2O_3$, or about 61 mol % or more, $K_1$ is less than 0 at room temperature. Accordingly, the bottom temperature of the magnetic loss can be controlled to be over room temperature when the composition of the ferrite is within the above two ranges. However, when the ferrite contains too much $Fe_2O_3$, the magnetic permeability and the electric resistivity are decreased as mentioned above.

Because of the above-mentioned reasons, it has been believed that the most appropriate composition of the main components of the MnZn type ferrite having a low magnetic loss and a high bottom temperature of a magnetic loss is about 53 to 54 mol % of $Fe_2O_3$, about 9 to 12 mol % of ZnO and the rest of MnO (S. Okamoto, et al., *Electronic Ceramics,* 16, p. 44 (winter, 1985)). Therefore, most of the ferrites with a low magnetic loss, which have actually been developed up to the present, have the above-mentioned composition. As an approach to decrease the magnetic loss, a method using compositions within or around the above-mentioned range for modifying the kind of additives or the fine structure of the ferrite has been mainly studied. The best ferrite obtained from such an approach has a low magnetic loss of about 500 kW/m³ when used at a frequency of 1 MHz.

For example, Japanese Laid-Open Patent Publication No. 1-224265 discloses a MnZn type ferrite comprising 52.2 to 55.4 mol % of $Fe_2O_3$, 4 to 13.5 mol % of ZnO and 31.1 to 43.8 mol % of MnO as main components, and further comprises at least one sub-component selected from 0.05 to 0.2 wt % of CaO, 0.015 to 0.027 wt % of $SiO_2$, 0.05 to 0.6 wt % of $TiO_2$ and 0.01 to 0.2 wt % of $Ta_2O_5$. This ferrite is sintered from powders having a particle size of 5 μm or less, and shows a magnetic loss of 300 to 400 kW/m³ at 1 MHz·50 mT.

SUMMARY OF THE INVENTION

The oxide magnetic material which is a sintered substance of this invention comprises, as main components, 55 to 59 mol % of $Fe_2O_3$; 35 to 42 mol % of MnO; and 6 mol % or less of ZnO, and the material further comprises as sub-components, 0.05 to 0.3 wt % of CaO; and 0.005 to 0.05 wt % of $SiO_2$.

In another aspect of the present invention, the oxide magnetic material comprises, as main components, 61 to 67 mol % of $Fe_2O_3$; 3 to 36 mol % of MnO; and 30 mol % or less of ZnO, end the material further comprises, as sub-components, 0.05 to 0.5 wt % of CaO; and 0.005 to 0.2 wt % of $SiO_2$.

In still another aspect of the present invention, a switching power supply with a switching frequency of 300 kHz to 5 MHz using this oxide magnetic material as a magnetic core is provided.

Thus, the invention described herein makes possible the advantages of (1) providing a magnetic material having an extremely low magnetic loss even when used in the high frequency band and having a bottom temperature of a magnetic loss sufficiently higher then room temperature, end (2) providing a switching power supply using the magnetic material as a magnetic core and having a switching frequency of 300 kHz to 5 MHz.

These and other advantages of the present invention will become apparent to those skilled in the art upon reading and understanding the following detailed description with reference to the accompanying figures.

DESCRIPTION OF THE PREFERRED EMBODIMENTS

Figure 1A:
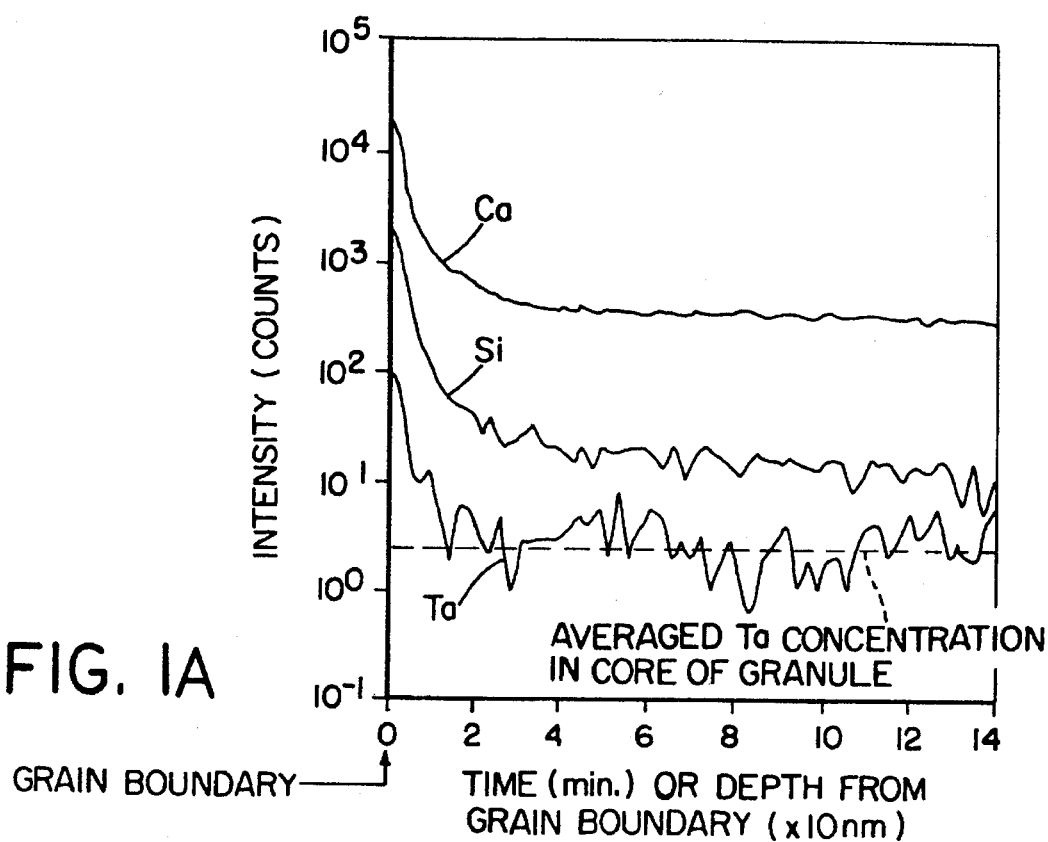
FIGS. 1A and 1B are profiles of a metal concentration in the direction of depth from a grain boundary of magnetic materials according to the present invention.

The inventors of the present invention actually produced various kinds of the MnZn type ferrites by changing composition ratios of main components in a wide range under conditions of adding the same additives without being restricted by the above-mentioned conventional range and studied effects of each composition ratio of the main components. As a result, it was found that a composition including excessive $Fe_2O_3$ as a main component provides ferrite having a bottom temperature of a magnetic loss of 40° C. or more and having a low magnetic loss when used in the high frequency band of 300 kHz to several MHz. The magnetic loss could be further reduced by using particular additives end adjusting the density of the ferrite.

A sintered substance as a first magnetic material according to the present invention includes 55 to 59 mol % of $Fe_2O_3$, 35 to 42 mol % of MnO and 6 mol % or less of ZnO as main components. The sintered substance further includes 0.05 to 0.3 wt % of CaO and 0.005 to 0.05 wt % of $SiO_2$ as essential sub-components, and still further contains 0.01 to 0.2 wt % of at least one kind of a third metal oxide $M_xO_z$. The third metal oxide $M_xO_z$ is selected from the group consisting of $ZrO_2$, $HfO_2$, $Ta_2O_5$, $Cr_2O_3$, $MoO_3$, $WO_3$, $Al_2O_3$, $Ga_2O_3$, $In_2O_3$, $GeO_2$, $SnO_2$, $Sb_2O_3$ and $Bi_2O_3$. A sintered substance as a second magnetic material according to the present invention includes 61 to 67 mol % of $Fe_2O_3$, 3 to 36 mol % of MnO and 30 mol % or less of ZnO as main components. This sintered substance further includes 0.05 to 0.5 wt % of CaO and 0.005 to 0.2 wt % of $SiO_2$ as essential sub-components. Preferably, this second magnetic material includes 62 to 66 mol % of $Fe_2O_3$, 14 to 28 mol % of MnO and 10 to 20 mol % of ZnO as main components. Preferably, this sintered substance still further includes 0.01 to 0.5 wt % of at least one kind of a metal oxide $M_xO_z$, which is selected from the group consisting of $ZrO_2$, $HfO_2$, $Ta_2O_5$, $Cr_2O_3$, $MoO_3$, $WO_3$, $Al_2O_3$, $Ga_2O_3$, $In_2O_3$, $GeO_2$, $SnO_2$, $Sb_2O_3$ and $Bi_2O_3$. These first and second magnetic materials were obtained through experiments and study by the inventors of the present invention described below.

According to the study of the inventors of the present invention, the absolute value of the magnetic loss of the MnZn type ferrite largely depended upon the composition ratio of the main components. As the amount of $Fe_2O_3$ was increased, the magnetic loss was decreased although the magnetic permeability and the electric resistivity were decreased. The absolute value of the magnetic loss could be further reduced by adding effective sub-components to the main components. In other words, a material with a low magnetic loss could be realized by selecting a particular composition of main components and adding a particular amount of CaO and $SiO_2$ thereto. Further, a material with a lower magnetic loss could be obtained by adding $M_xO_z$ to the main and sub-components. However, if the composition ratio of the main components was not appropriate, addition of an appropriate amount of CaO, $SiO_2$ and $M_xO_z$ did not provide a material with a sufficiently low magnetic loss. Moreover, some compositions of the main components could not make the magnetic loss low even with the additives. Therefore, the composition of the main components, especially the amount of $Fe_2O_3$, is critical. A material with the lowest magnetic loss can be realized only when an appropriate amount of sub-components are added under an appropriate condition to main components with an appropriate composition ratio.

Next, the design of a magnetic material having a bottom temperature of a magnetic loss higher than room temperature and having the minimum magnetic loss over a temperature at which the material is actually used will now be described. As mentioned above, in the prior art, the bottom temperature of a magnetic loss has been explained by the crystallomagnetic anisotropic coefficient $K_1$, which varies depending upon temperature. According to this theory, there are two ranges of the composition of the main components in the MnZn type ferrite which can adjust the bottom temperature of a magnetic loss to be over room temperature.

At first, the inventors of the present invention studied a case where 60 mol % or less of $Fe_2O_3$ was contained. As a result, it was found that the secondary peak of the magnetic permeability was decreased as the amount of $Fe_2O_3$ was increased as in the conventional theory. However, in the high frequency band over about 1 MHz, the bottom temperature of a magnetic loss did not always correspond to the temperature at which the secondary peak of the magnetic permeability appeared. Actually, the bottom temperature of a magnetic loss was frequently lower than the theoretical value by several tens of degrees centigrade. Thus the range of the usable amount of $Fe_2O_3$ was narrowed. Especially when 9 to 12 mol % of ZnO was contained, which was conventionally considered to be a suitable composition, the temperature was largely shifted. In this composition, the bottom temperature of a magnetic loss was below room temperature at a frequency of 1 MHz unless the amount of $Fe_2O_3$ was about 54 mol % or less.

The inventors of the present invention then studied a composition ratio of the main components of the MnZn type ferrite, considering the above described fact. As a result, it was found that the shift of the bottom temperature of a magnetic loss from the secondary peak of the magnetic permeability, that is, the shift from the theoretical value was largely varied depending upon the Mn/Zn ratio even when the same amount of $Fe_2O_3$ was contained. When the amount of ZnO was 6 mol % or less, the difference from the theoretical value was decreased as the amount of ZnO was decreased, and sometimes the bottom temperature of a magnetic loss was shifted to be higher than the theoretical value. In the prior art, the amount of $Fe_2O_3$ is restricted to 54 mol % or less so that the bottom temperature of a magnetic loss might not be too low. However, it has been impossible to obtain a material with a sufficiently low magnetic loss. In the present invention, it is possible to drastically decrease the magnetic loss and maintain the bottom temperature of magnetic loss at 40° C. or more even when the amount of $Fe_2O_3$ is 55 to 59 mol % by decreasing the amount of ZnO from that in the prior art.

Second, the inventors studied a case where 60 mol % or more of $Fe_2O_3$ was contained. As a result, it was found that $K_1$ decreased as the amount of $Fe_2O_3$ was increased, resulting in a raised bottom temperature of magnetic loss. Materials having a composition ratio within this range had lower electric resistivity and lower magnetic permeability as compared with the material containing 53 to 54 mol % of $Fe_2O_3$, which is conventionally regarded to be the most appropriate, or a ferrite containing 55 to 59 mol % of $Fe_2O_3$. However, the magnetic loss in the high frequency band was very low, which is different from the conventional teachings.

Further, the inventors studied the decrease of the magnetic loss at the fine structure level by using the additives on the above-mentioned composition of the main components. As a result, it was found that the magnetic loss could be further decreased by adding a small amount of a third metal oxide $M_xO_z$ in addition to the above-mentioned sub-components.

As the third additive, a metal oxide $M_xO_z$ is used. Preferable examples of $M_xO_z$ include $ZrO_2$, $HfO_2$, $Ta_2O_5$, $Cr_2O_3$, $MoO_3$, $WO_3$, $Al_2O_3$, $Ga_2O_3$, $In_2O_3$, $GeO_2$, $SnO_2$, $Sb_2O_3$ and $Bi_2O_3$. One of the metal oxides or a combination of two or more of them can be used. The added amount thereof is preferably 0.01 to 0.5 wt %.

When a composite additive including four kinds or more of additives, that is, two or more kinds of metal oxides $M_xO_z$ as the third additives in addition to CaO and $SiO_2$, was used, the effect of minimizing the magnetic loss was also obtained insofar as the total amount of all the used metal oxides exceeded the lower limit of the third additive even if the amount of one of the used metal oxides was less than the lower limit. Of course, when the amount of each metal oxide $M_xO_z$ was within the range, the magnetic loss was decreased as compared with a material in which CaO and $SiO_2$ alone were used on the main components. Especially, when $ZrO_2$ and another metal oxide were used together us $M_xO_z$, not only the magnetic loss was decreased but also the resulting sintered substance was effectively prevented from chipping or breaking. Moreover, addition or containment as impurities of other additives such as $TiO_2$, CoO, NiO, $V_2O_5$ and $Nb_2O_5$ caused no problems insofar as the amount to be added was not too large.

When a large amount of the third additive was used, the electric resistivity was increased and the eddy current loss was decreased. However, when the third additive was dissolved or dispersed in granules of the ferrite and distributed uniformly into the grain boundary and the center of a particle, the hysteresis loss was increased. Therefore, the amount of the third additive to be added must be as small as possible so as to form a thin and uniform deposition in the vicinity of the grain boundary. Thus, a material with a low magnetic loss was obtained. In other words, the magnetic loss was further decreased by making the concentration of the third additive(s) in the grain boundary five times or more as high as the concentration in the inside of the particle. It is known that the eddy current loss can be reduced by adding CaO and SiO$_2$ at the same time and distributing them in the grain boundary so as to make the electric resistivity higher. The "grain boundary" used herein means the vicinity of the surface of a granule or grain constituting a sintered substance of the ferrite composition. Moreover, it is known that the magnetic loss can be further decreased by using a selected third additive. However, in the prior art, the third additive is not distributed in the grain boundary. According to the study of the fine structure by the inventors of the present invention, it was found to be important to distribute the third additive(s) in the grain boundary.

Further, the inventors found that the density of the sintered substance affected the magnetic loss. Preferably a sintered substance using the MnZn type ferrite with a low magnetic loss has a density of 4.6 g/cm$^3$ or more. If the density of the sintered substance was low, the magnetic loss was increased because an effective cross section was decreased. Moreover, a sintered substance with a low density can be easily affected by the atmosphere when cooled after sintering. In such a case, Fe is reduced. Therefore, especially in a composition including a large amount of Fe$_2$O$_3$, it is difficult to obtain essential characteristics of the ferrite without controlling the atmosphere accurately. As a result, the production yield of the sintered substances was decreased. But the yield was improved by making the density 4.6 g/cm$^3$ or more.

The relative magnetic permeability is preferably in a range of 400 or more and 1600 or less. As for the electric resistivity, DC resistance is preferably 100 to 2000 Ω·cm, and AC resistance (at a frequency of 1MHz) is preferably about 10 Ω·cm or more. The magnetic permeability and the electric resistivity vary depending upon grain size. Too small grains reduce the magnetic permeability and too large grains decrease the electric resistivity. An average grain size is preferably 10 μm or less, and more preferably 2 to 5 μm.

The MnZn type ferrite material according to the present invention has a bottom temperature of a magnetic loss over 40° C. and a low magnetic loss even if measured in a frequency band over 1MHz. Therefore, a switching power supply with a switching frequency of 300 kHz to 5 MHz using this material as a core of an inverter is compact and of high efficiency and hardly causes any thermorunaway.

Figure 2:
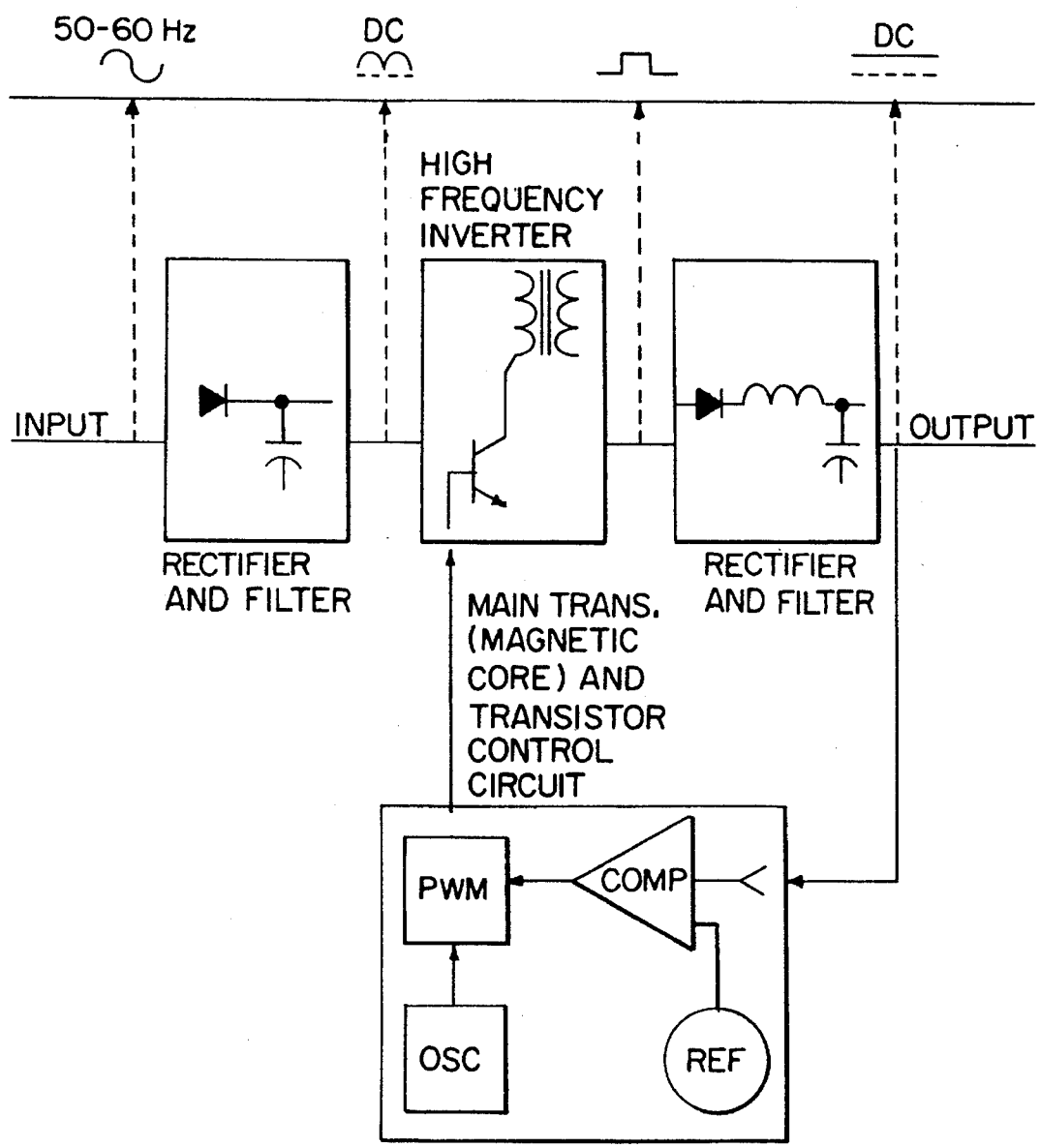
FIG. 2 is an example of a circuit for a switching power supply using the magnetic material of the present invention.

Such a magnetic material can be used, as a core of an inverter, in a circuit for a switching power supply, for example, as shown in FIG. 2.

EXAMPLES

The present invention will now be described by way of examples.

Example 1

α-Fe$_2$O$_3$, MnCO$_3$ and ZnO all of which are in the shape of powder and have purity of 99.5% were used as starting materials. Each powder was weighed so as to make a total weight to be 300 g in a composition ratio of each sample as shown in Table 1. All the powder was mimed and wet-ground for 10 hours using a ball mill, end then dried. The mixed powder was calcined in air at 850° C. for 2 hours. CaCO$_3$ and SiO$_2$ were added thereto so that the resulting mixture contained 0.1 wt % of CaO and 0.02 wt % of SiO$_2$. The resulting mixture was again wet-ground for 10 hours by a ball mill, and dried.

Ten wt % of an aqueous solution including 5 wt % of polyvinyl alcohol was added to the calcined powder. The resultant mixture was allowed to pass through a 30 mesh screen to obtain uniform granules. The granules were molded by using a uniaxial molding to give compact bodies. The resulting compact bodies were heated in air at 500° C. for 1 hour to get the binder out, and then sintered under either the following conditions; A or B:

Condition A: The compact body was sintered at a temperature of 1200° C. The temperature was raised in atmosphere of air. While keeping the highest temperature, atmosphere of oxygen was controlled depending upon an equilibrium oxygen partial pressure for each ferrite. Cooling was performed in a nitrogen rich atmosphere. Concretely, while keeping the highest temperature, a plurality of the compact bodies were respectively sintered at several kinds of oxygen partial pressures in a range of 0.1 to 5% to select the most appropriate one. While cooling, a flow rate of nitrogen was gradually increased and the oxygen partial pressure was gradually decreased. The sintering time and pressure during molding were varied so as to make the average grain size of the resulting sintered substance to be about 3 to 5 μm, the desired density to be about 4.6 to 4.7 g/cm$^3$ and an actual density to be 4.5 to 4.8 g/cm$^3$.

Condition B: The temperature and the atmosphere were the same as in Condition A. The sintering time and pressure during molding were varied so as to make an average grain size of the resulting sintered substance to be 4 μm or less, the desired density to be about 4.4 g/cm$^3$ and an actual density to be 4.3 to 4.6 g/cm$^3$.

Measurement of a magnetic loss and a bottom temperature of a magnetic loss: A ring-shaped sample having an outer diameter of 20 mm, an inner diameter of 14 mm and a thickness of 3 mm was cut 15 out from each of the resulting sintered substances. Each ring-shaped sample was measured for its magnetic loss under conditions of 1 MHz·50 mT at 20° C. intervals between 20° C. and 120° C.

Measurement of a magnetic loss: The ring-shaped ferrite core was coated with one layer of insulating tape. Then the core was wound with an insulated lead wire with a diameter of 0.26 mm. The magnetic loss of the sample was measured by using an alternating current B-H curve tracer. The results are shown in Table 1.

TABLE 1-1

| | Effect of main component | | | | |
|---|---|---|---|---|---|
| Sample | Composition (mol %)[1)] | | | Temperature (°C.)[2)]/ Magnetic Loss (kW/m$^3$) | |
| No. | Fe$_2$O$_3$ | ZnO | MnO | Condition A | Condition B |
| 1 | 52 | 2 | 46 | ≧120/1420 —[3)] | ≧120/1490 |
| 2 | 52 | 3 | 45 | ≧120/1290 — | ≧120/1350 |
| 3 | 52 | 6 | 42 | ≧120/1170 — | 100/1110 |
| 4 | 52 | 10 | 38 | 60/890 — | 60/910 |
| 5 | 53 | 2 | 45 | ≧120/960 — | ≧120/990 |
| 6 | 53 | 3 | 44 | ≧120/640 *[4)] | 100/630 |
| 7 | 53 | 6 | 41 | 100/520 * | 80/500 |
| 8 | 53 | 9 | 38 | 80/630 * | 60/680 |
| 9 | 53 | 10 | 37 | 60/710 — | 40/720 |
| 10 | 54 | 4 | 42 | 100/520 * | 80/550 |
| 11 | 54 | 6 | 40 | 100/420 * | 80/440 |
| 12 | 55 | 0 | 45 | ≧120/880 — | 100/920 |
| 13 | 55 | 1 | 44 | 100/670 * | 80/900 |
| 14 | 55 | 2 | 43 | 100/440 * | 80/860 |
| 15 | 55 | 3 | 42 | 100/290 **[5)] | 80/550 |
| 16 | 55 | 4 | 41 | 100/280 ** | 80/420 |

TABLE 1-1-continued

Effect of main component

| Sample No. | Composition (mol %)[1] | | | Temperature (°C.)[2]/ Magnetic Loss (kW/m³) | | |
|---|---|---|---|---|---|---|
| | Fe₂O₃ | ZnO | MnO | Condition A | | Condition B |
| 17 | 55 | 6 | 39 | 80/250 | ** | 60/300 |
| 18 | 55 | 8 | 37 | 80/460 | * | 60/400 |
| 19 | 55 | 9 | 36 | 60/500 | * | 60/490 |
| 20 | 55 | 10 | 35 | 40/650 | * | 40/620 |
| 21 | 56 | 4 | 40 | 80/240 | ** | 80/420 |
| 22 | 56 | 6 | 38 | 80/230 | ** | 60/480 |
| 23 | 57 | 0 | 43 | 80/420 | * | 80/950 |
| 24 | 57 | 1 | 42 | 80/290 | ** | 60/950 |
| 25 | 57 | 2 | 41 | 80/200 | ** | 60/930 |
| 26 | 57 | 3 | 40 | 80/180 | ** | 60/570 |
| 27 | 57 | 4 | 39 | 80/190 | ** | 60/540 |
| 28 | 57 | 5 | 39 | 80/220 | ** | 60/550 |
| 29 | 57 | 6 | 37 | 60/230 | ** | 60/530 |
| 30 | 57 | 7 | 36 | 60/360 | * | 60/580 |
| 31 | 57 | 8 | 35 | 60/380 | * | 60/570 |
| 32 | 57 | 9 | 34 | 40/430 | * | 60/620 |
| 33 | 57 | 10 | 33 | 40/490 | * | 40/500 |
| 34 | 58 | 2 | 40 | 60/240 | ** | ≦20/990 |
| 35 | 58 | 4 | 38 | 60/210 | ** | ≦20/560 |
| 36 | 58 | 5 | 37 | 60/220 | ** | ≦20/620 |
| 37 | 58 | 6 | 36 | 60/280 | ** | ≦20/720 |
| 38 | 58 | 10 | 32 | ≦20/460 | — | ≦20/950 |
| 39 | 59 | 0 | 41 | 40/470 | * | ≦20/980 |
| 40 | 59 | 3 | 38 | 40/290 | ** | 20/840 |
| 41 | 59 | 4 | 37 | 40/280 | ** | ≦20/710 |
| 42 | 59 | 6 | 35 | 40/300 | ** | ≦20/800 |
| 43 | 59 | 9 | 32 | ≦20/550 | — | ≦20/1090 |
| 44 | 60 | 0 | 40 | ≦20/660 | — | ≦20/930 |
| 45 | 60 | 3 | 37 | ≦20/450 | — | ≦20/960 |
| 46 | 60 | 6 | 34 | ≦20/570 | — | ≦20/930 |
| 47 | 60 | 15 | 25 | 40/800 | — | |
| 48 | 60 | 30 | 10 | 80/920 | — | |
| 49 | 61 | 0 | 39 | 40/1100 | — | |
| 50 | 61 | 3 | 36 | 60/650 | * | |
| 51 | 61 | 15 | 24 | 60/540 | * | |
| 52 | 61 | 30 | 9 | 100/670 | * | |
| 53 | 61 | 31 | 8 | 100/880 | — | |
| 54 | 62 | 10 | 28 | 60/250 | ** | |
| 55 | 62 | 20 | 18 | 80/220 | ** | |
| 56 | 64 | 0 | 36 | 60/680 | * | |
| 57 | 64 | 8 | 28 | 60/450 | * | |
| 58 | 64 | 15 | 21 | 80/150 | ** | |
| 59 | 64 | 22 | 14 | 100/420 | * | |
| 60 | 66 | 10 | 24 | 80/250 | ** | |
| 61 | 66 | 20 | 14 | 100/270 | ** | |
| 62 | 67 | 0 | 33 | 80/690 | * | |
| 63 | 67 | 15 | 18 | 100/520 | * | |
| 64 | 67 | 30 | 3 | 120/670 | * | |
| 65 | 67 | 31 | 2 | 120/820 | — | |
| 66 | 68 | 0 | 32 | 80/900 | — | |
| 67 | 68 | 15 | 17 | 100/870 | — | |
| 68 | 68 | 30 | 2 | 120/940 | — | |

[1] In addition to these main components. 0.02 wt % of $SiO_2$ and 0.1 wt % of CaO are contained as sub-components.
[2] The bottom temperature of the loss of magnetism (magnetic loss).
[3] —: The bottom temperature of magnetic loss is lower than 40° C. and/or magnetic loss is greater than 700 (KW/m³).
[4] *: The bottom temperature of magnetic loss is greater than 40° C. and magnetic loss is lower than 700 (KW/m³).
[5] **: The bottom temperature of magnetic loss is greater than 40° C. and magnetic loss is lower than 300 (KW/m³).

The results under Condition A shown in Table 1 show that the sintered substances having the following composition of the main components have a bottom temperature of a magnetic loss of 40° C. or more and the magnetic loss was as low as 700 kw/m³ or less: 53 to 59 mol % of $Fe_2O_3$, 34 to 44 mol % of MnO and 9 mol % or less of ZnO; and 61 to 67 mol % of $Fe_2O_3$, 3 to 36 mol % of MnO and 30 mol % or less of ZnO. The samples having these excellent properties are marked with (*) in Table 1.

Further, the sintered substances having the following composition of the main components have a bottom temperature of a magnetic loss of 40° C. or more and the magnetic loss was as low as 300 kw/m³ or less: 55 to 59 mol % of $Fe_2O_3$, 35 to 42 mol % of MnO and 1 to 6 mol % of ZnO; and 62 to 66 mol % of $Fe_2O_3$, 14 to 28 mol % of MnO and 10 to 20 mol % of ZnO. The samples having these excellent properties are marked with (**) in Table 1.

However, under Condition B in which the desired density was about 4.4 g/cm³ and actually was less than 4.6 g/cm³, the resulting sintered substances generally had a higher magnetic loss than the sintered substances obtained under Condition A. The magnetic loss was especially large when 58 mol % or more of $Fe_2O_3$ was contained therein. The following seems to be the reasons: Because of its low density, (1) the effective cross section was decreased; and (2) the resulting sintered substance was ununiform because the inside of the sintered substance was partially reduced due to the nitrogen rich atmosphere used during cooling. The bottom temperature of a magnetic loss was relatively low in the sintered substances obtained under Condition B as compared with those obtained under Condition A. This seems to be due to the increased amount of $Fe^{+2}$ due to the reduction during cooling. Thus, it is preferable that the density of the sintered substance is high.

Example 2

A sintered substance was produced in the composition ratio of each sample shown in Table 2 in the same manner as in Example 1 under sintering conditions A or B except for the following: $CaCo_3$, $SiO_2$ and $Ta_2O_5$ were added so that the resulting mixture contained 0.1 wt % of CaO, 0.02 wt % of SiO and 0.1 wt % of $Ta_2O_5$. The resulting sintered substances were measured for the magnetic loss and the bottom temperature of a magnetic loss in the same manner as in Example 1. The results are shown in Table 2.

TABLE 2-1

Effect of main component

| Sample No. | Composition (mol %)[1] | | | Temperature (°C.)[2]/ Magnetic Loss (kW/m³) | | |
|---|---|---|---|---|---|---|
| | Fe₂O₃ | ZnO | MnO | Condition A | | Condition B |
| 1 | 52 | 2 | 46 | ≧120/1390 | —[3] | ≧120/1480 |
| 2 | 52 | 3 | 45 | ≧120/1220 | — | ≧120/1320 |
| 3 | 52 | 6 | 42 | ≧120/1140 | — | 100/1090 |
| 4 | 52 | 10 | 38 | 60/790 | — | 60/850 |
| 5 | 53 | 2 | 45 | ≧120/880 | — | ≧120/920 |
| 6 | 53 | 3 | 44 | ≧120/550 | *[4] | 100/590 |
| 7 | 53 | 6 | 41 | 100/430 | * | 80/440 |
| 8 | 53 | 9 | 38 | 80/550 | * | 60/580 |
| 9 | 53 | 10 | 37 | 60/620 | — | 40/650 |
| 10 | 54 | 4 | 42 | 100/440 | * | 80/520 |
| 11 | 54 | 6 | 40 | 100/350 | * | 80/390 |
| 12 | 55 | 0 | 45 | ≧120/820 | — | 100/880 |
| 13 | 55 | 1 | 44 | 100/590 | * | 80/830 |
| 14 | 55 | 2 | 43 | 100/370 | * | 80/800 |
| 15 | 55 | 3 | 42 | 100/220 | **[5] | 80/470 |
| 16 | 55 | 4 | 41 | 100/190 | ** | 80/350 |
| 17 | 55 | 6 | 39 | 80/180 | ** | 60/230 |
| 18 | 55 | 8 | 37 | 80/380 | * | 60/360 |
| 19 | 55 | 9 | 36 | 60/410 | * | 60/410 |
| 20 | 55 | 10 | 35 | 40/580 | * | 40/550 |
| 21 | 56 | 4 | 40 | 80/140 | ** | 80/390 |
| 22 | 56 | 6 | 38 | 80/150 | ** | 60/400 |
| 23 | 57 | 0 | 43 | 80/420 | * | 80/870 |
| 24 | 57 | 1 | 42 | 80/230 | ** | 60/850 |
| 25 | 57 | 2 | 41 | 80/130 | ** | 60/850 |
| 26 | 57 | 3 | 40 | 80/100 | ** | 60/500 |

TABLE 2-1-continued

Effect of main component

| Sample No. | Composition (mol %)[1] | | | Temperature (°C.)[2]/ Magnetic Loss (kW/m³) | | |
|---|---|---|---|---|---|---|
| | $Fe_2O_3$ | ZnO | MnO | Condition A | | Condition B |
| 27 | 57 | 4 | 39 | 80/90 | ** | 80/470 |
| 28 | 57 | 5 | 38 | 80/110 | ** | 60/470 |
| 29 | 57 | 6 | 37 | 60/120 | ** | 60/460 |
| 30 | 57 | 7 | 36 | 60/250 | * | 60/480 |
| 31 | 57 | 8 | 35 | 60/310 | * | 60/490 |
| 32 | 57 | 9 | 34 | 40/350 | * | 60/560 |
| 33 | 57 | 10 | 33 | 40/420 | * | 40/440 |
| 34 | 58 | 2 | 40 | 60/150 | ** | ≦20/870 |
| 35 | 58 | 4 | 38 | 60/120 | ** | ≦20/480 |
| 36 | 58 | 5 | 37 | 60/120 | ** | ≦20/510 |
| 37 | 58 | 6 | 36 | 60/220 | ** | ≦20/640 |
| 38 | 58 | 10 | 32 | ≦20/390 | — | ≦20/890 |
| 39 | 59 | 0 | 41 | 40/380 | * | ≦20/900 |
| 40 | 59 | 3 | 38 | 40/210 | ** | ≦20/790 |
| 41 | 59 | 4 | 37 | 40/200 | ** | ≦20/630 |
| 42 | 59 | 6 | 35 | 40/230 | ** | ≦20/720 |
| 43 | 59 | 9 | 32 | ≦20/470 | — | ≦20/1030 |
| 44 | 60 | 0 | 40 | ≦20/550 | — | ≦20/890 |
| 45 | 60 | 3 | 37 | ≦20/330 | — | ≦20/840 |
| 46 | 60 | 6 | 34 | ≦20/500 | — | ≦20/850 |
| 47 | 60 | 15 | 25 | 40/630 | — | |
| 48 | 60 | 30 | 10 | 80/720 | — | |
| 49 | 61 | 0 | 39 | 40/980 | — | |
| 50 | 61 | 3 | 36 | 60/580 | * | |
| 51 | 61 | 15 | 24 | 60/450 | * | |
| 52 | 61 | 30 | 9 | 100/590 | * | |
| 53 | 61 | 31 | 8 | 100/710 | — | |
| 54 | 62 | 10 | 28 | 60/180 | ** | |
| 55 | 62 | 20 | 18 | 80/150 | ** | |
| 56 | 64 | 0 | 36 | 60/570 | * | |
| 57 | 64 | 8 | 28 | 60/250 | * | |
| 58 | 64 | 15 | 21 | 80/90 | ** | |
| 59 | 64 | 22 | 14 | 80/220 | * | |
| 60 | 66 | 10 | 24 | 80/200 | ** | |
| 61 | 66 | 20 | 14 | 100/170 | ** | |
| 62 | 67 | 0 | 33 | 80/590 | * | |
| 63 | 67 | 15 | 18 | 100/460 | * | |
| 64 | 67 | 30 | 3 | 120/560 | * | |
| 65 | 67 | 31 | 2 | 120/720 | — | |
| 66 | 68 | 0 | 32 | 80/820 | — | |
| 67 | 68 | 15 | 17 | 100/730 | — | |
| 68 | 68 | 30 | 2 | 120/840 | — | |

[1] In addition to these main components. 0.02 wt % of $SiO_2$, 0.1 wt % of CaO and 0.1 wt % of $Ta_2O_5$ are contained.
[2] The bottom temperature of the loss of magnetism (magnetic loss).
[3] —: The bottom temperature of magnetic loss is lower than 40° C. and/or magnetic loss is greater than 600 (KW/m³).
[4] *: The bottom temperature of magnetic loss is greater than 40° C. and magnetic loss is lower than 600 (KW/m³).
[5] **: The bottom temperature of magnetic loss is greater than 40° C. and magnetic loss is lower than 230 (KW/m³).

The results under Condition A shown in Table 2 show, as in Example 1, that the sintered substances having the following composition of the main components have a bottom temperature of a magnetic loss of 40° C. or more and the magnetic loss was as low as 600 kW/m³ or less: 53 to 59 mol % of $Fe_2O_3$, 34 to 44 mol % of MnO and 9 mol % or less of ZnO; and 61 to 67 mol % of $Fe_2O_3$, 3 to 36 mol % of MnO and 30 mol % or less of ZnO. The samples having these excellent properties are marked with (*) in Table 2.

Further, the sintered substances having the following composition of the main components have a bottom temperature of a magnetic loss of 40° C. or more and the magnetic loss was as low as about 200 kW/m³ or less and 90 kW/m³ at the lowest: 55 to 59 mol % of $Fe_2O_3$, 35 to 42 mol % of MnO and 1 to 6 mol % of ZnO; and 62 to 66 mol % of $Fe_{2l\ O_3}$, 14 to 28 mol % of MnO and 10 to 20 mol % of ZnO. The samples having these excellent properties are marked with (**) in Table 2. Comparing these results with those in Example 1, the magnetic loss is decreased by about 100 kW/m³ in Example 2, in which $Ta_2O_5$ was further added along with CaO and $SiO_2$.

On the other hand, in the sintered substances obtained under Condition B having a lower density, the magnetic loss is generally larger and the bottom temperature of a magnetic loss is lower than those of the sintered substances obtained under Condition A as shown in Example 1. Therefore, also in cases where these three sub compositions are used, it is preferable that the density of the sintered substance be high.

Next, the resulting sintered substances were broken to observe their broken-out sections. Intergranular fractures were observed in all of the substances. In other words, the substances were broken at boundaries between particles without breaking the particles. An average grain size was about 4 μm. Samples 14, 17, 20, 26 and 29 obtained under conditions A and B and samples 50, 52, 56, 62 and 64 obtained under Condition A were measured for distribution of Ta elements on the broken-out sections by secondary ion-mass spectroscopy (SIMS). When several tens of points with a small size of 3×3 μm on one sample were analyzed, the Ta concentration deviated from point to point. Therefore, an average concentration in an area with a size of 50×50 μm was obtained in each sample. A profile of Ta elements in the direction of depth from the broken-out section was obtained. It was found, all the samples, the larger the distance from the broken-out section (i.e., the grain boundary) was, the lower the Ta concentration became, and when the distance was about several to several tens of nm or more, the Ta concentration remained constant. In all samples, the concentration of the grain boundary was about 10 times or more as high as the cons%ant concentration inside the granule.

Example 3

Powder of $Fe_2O_3$, MnO and ZnO was respectively weighed so as to make a total weight to be 300 g in a composition ratio of 56.5 mol % of $Fe_2O_3$, 40 mol % of MnO and 3.5 mol % of ZnO in the same manner as in Example 1. The powder was mixed and wet-ground for 10 hours by a ball mill, and then dried. The mixed powder was calcined in air for 2 hours at 800° C. $CaCO_3$ and $SiO_2$ were added so that the resulting mixture contained CaO and $SiO_2$ with the respective amounts shown in Table 3. The resulting powder was again mixed and wet-ground for 10 hours by a ball mill, and dried. Sintered substances (a) were made from this calcined powder under Condition A described in Example 1.

Sintered substances (b) were made in the same manner as above except for a composition ratio of 65 mol % of $Fe_2O_3$, 17 mol % of MnO, 18 mol % of ZnO, and CaO and $SiO_2$ of the respective amounts as shown in Table 4.

These sintered substances (a) and (b) were measured for the magnetic loss and the bottom temperature of a magnetic loss in the same manner and under the same condition as in Example 1 (1MHz, 50 mT). As a result, both sintered substances (a) and (b) showed a bottom temperature of a magnetic loss of 80° C. in any combination of %he amounts of CaO and $SiO_2$. The magnetic loss of the sintered substances (a) and (b) are shown in Tables 3 and 4, respectively.

TABLE 3

Effect of sub-components

| SiO$_2$ (wt %) | 0 | 0.003 | 0.005 | 0.02 | 0.05 | 0.06 |
|---|---|---|---|---|---|---|
| CaO (wt %) 0 | 1510 | 1330 | 1190 | 990 | 850 | 770 |
| 0.03 | 1390 | 970 | 610 | 460 | 580 | 690 |
| 0.05 | 1280 | 650 | 290 | 240 | 260 | 570 |
| 0.2 | 1140 | 490 | 280 | 220 | 250 | 520 |
| 0.3 | 1180 | 520 | 320 | 250 | 270 | 540 |
| 0.4 | 1220 | 600 | 550 | 530 | 550 | 610 KW/m$^3$ |

Main components: Fe$_2$O$_3$ 56.5 mol % ZnO 3.5 mol % MnO 40 mol %; sintering condition: A.

TABLE 4

Effect of sub-components

| SiO$_2$ (wt %) | 0 | 0.003 | 0.005 | 0.01 | 0.1 | 0.2 | 0.3 |
|---|---|---|---|---|---|---|---|
| CaO (wt %) 0 | 1610 | 1370 | 1190 | 990 | 850 | 770 | 700 |
| 0.03 | 1390 | 970 | 610 | 460 | 580 | 690 | 620 |
| 0.05 | 1280 | 650 | 310 | 240 | 270 | 340 | 540 |
| 0.1 | 1110 | 460 | 220 | 180 | 260 | 280 | 410 |
| 0.2 | 1140 | 490 | 280 | 220 | 250 | 320 | 520 |
| 0.5 | 1180 | 520 | 320 | 240 | 270 | 350 | 670 |
| 0.6 | 1220 | 600 | 550 | 530 | 550 | 610 | 820 KW/m$^3$ |

Main components: Fe$_2$O$_3$ 65 mol % MnO 17 mol % ZnO 18 mol %; sintering condition: A.

As is evident from Tables 3 and 4, when either CaO or SiO$_2$ alone was used, the resulting sintered substance has a large magnetic loss. The magnetic loss is decreased by a combination of CaO and SiO$_2$. Especially in the following ranges, the sintered substances have a low magnetic loss of about 300 kW/m$^3$: in the sintered substances (a), $0.05 \leq CaO \leq 0.3$ wt % and $0.005 \leq SiO_2 \leq 0.05$ wt %; and in the sintered substances (b), $0.05 \leq CaO \leq 0.5$ wt % and $0.005 \leq SiO_2 \leq 0.2$ wt %.

Example 4

Sintered substances (c) were made under condition A of Example 1 by using 56.5 mol % of Fe$_2$O$_3$, 40 mol % of MnO, 3.5 mol % of ZnO as main components, and adding ZrO$_2$, CaCo$_3$ and SiO$_2$ thereto so that the resulting mixture contained 0.05 wt % of ZrO$_2$ and CaO and SiO$_2$ with the respective amounts shown in Table 5. Sintered substances (d) were made under Condition A of Example 1 by using 65 mol % of Fe$_2$O$_3$, 17 mol % of MnO, 18 mol % of ZnO as main components, and by adding ZrO$_2$, CaCo$_3$ and SiO$_2$ thereto so that the resulting mixture contained 0.05 wt % of ZrO$_2$ and CaO and SiO$_2$ with the amounts shown in Table 6. A ring-shaped sample obtained from each of the resulting sintered substances was measured for the magnetic loss and the bottom temperature of a magnetic loss under the same condition as in Example 3. The results showed all samples of the sintered substances (c) had the minimum magnetic loss at a temperature of 80° C. the magnetic loss of the sintered substances (c) and (d) are shown in Tables 5 and 6, respectively.

TABLE 5

Effect of sub-components on composition containing 3rd additive

| SiO$_2$ (wt %) | 0 | 0.003 | 0.005 | 0.02 | 0.05 | 0.06 |
|---|---|---|---|---|---|---|
| CaO (wt %) 0 | 1490 | 1220 | 1050 | 860 | 760 | 780 |
| 0.03 | 1220 | 880 | 490 | 390 | 480 | 550 |
| 0.05 | 1170 | 530 | 200 | 130 | 170 | 500 |
| 0.2 | 1110 | 400 | 160 | 120 | 160 | 440 |
| 0.3 | 1130 | 450 | 210 | 150 | 180 | 460 |
| 0.4 | 1190 | 510 | 480 | 470 | 490 | 520 (KW/m$^3$) |

Main components: Fe$_2$O$_3$ 56.5 mol % MnO 40 mol % ZnO 3.5 mol %; 3rd subcomponent: ZrO$_2$ 0.05 wt %; sintering condition: A.

TABLE 6

Effect of sub-components on composition containing 3rd addtive

| SiO$_2$ (wt %) | 0 | 0.003 | 0.005 | 0.01 | 0.1 | 0.2 | 0.3 |
|---|---|---|---|---|---|---|---|
| CaO (wt %) 0 | 1580 | 1270 | 1020 | 860 | 780 | 650 | 620 |
| 0.03 | 1250 | 870 | 550 | 320 | 450 | 570 | 590 |
| 0.05 | 1080 | 570 | 280 | 180 | 210 | 300 | 500 |
| 0.1 | 950 | 400 | 180 | 120 | 150 | 220 | 380 |
| 0.2 | 940 | 440 | 210 | 140 | 170 | 280 | 480 |
| 0.5 | 1020 | 480 | 280 | 180 | 230 | 320 | 550 |
| 0.6 | 1120 | 580 | 450 | 470 | 490 | 580 | 770 (KW/m$^3$) |

Main components: Fe$_2$O$_3$ 65 mol % MnO 17 mol % ZnO 18 mol %; 3rd sub-component: ZrO$_2$ 0.05 wt %; sintering condition: A.

As is evident from a comparison between Tables 3 and 4 of Example 2 and Tables 5 and 6 of this example, the sintered substances including the third additive ZrO$_2$ have a lower magnetic loss in any combination of the amounts of CaO and SiO$_2$.

Especially in the following ranges, the sintered substances have a low magnetic loss if the third additive ZrO$_2$ is added thereto: in the sintered substances (a), $0.05 \leq CaO \leq 0.3$ wt % and $0.005 \leq SiO_2 \leq 0.05$ wt %; and in the sintered substances (b), $0.05 \leq CaO \leq 0.5$ wt % and $0.005 \leq SiO_2 \leq 0.2$ wt %.

Example 5

Powder of Fe$_2$O$_3$, MnO and ZnO was respectively weighed so as to make a total weight to be 300 g in a composition ratio of 56.5 mol % of Fe$_2$O$_3$, 39.5 mol % of MnO and 4 mol % of ZnO in the same manner as in Example 1. The powder was mixed and wet-ground for 10 hours by a ball mill, and then dried. The mixed powder was calcined in air for 2 hours at 800° C. CaCO$_3$ and other metal oxides were added thereto so that the resulting mixture contained 0.1 wt % of CaO, 0.02 wt % of SiO$_2$, and ZrO$_2$, HfO$_2$, Ta$_2$O$_5$, Cr$_2$O$_3$, MoO$_3$, WO$_3$, Al$_2$O$_3$, Ga$_2$O$_3$, In$_2$O$_3$, GeO$_2$, SnO$_2$, Sb$_2$O$_3$ or Bi$_2$O$_3$ with the respective amounts shown in Table 7. Sintered substances containing these metal oxides were made under Condition A of Example 1.

Further, sintered substances including the above-mentioned additives were made in the same manner as above except for a composition ratio of 65.5 mol % of Fe$_2$O$_3$, 17.5 mol % of MnO, 17 mol % of ZnO.

A ring-shaped sample obtained from each of the sintered substances was measured for the magnetic loss and the bottom temperature of a magnetic loss under the same condition as in Example 1. The results showed the minimum magnetic loss in any sample was obtained at 80° C. The magnetic loss of the sintered substances including 56.5 mol % of Fe$_2$O$_3$ and including 65.5 mol % of Fe$_2$O$_3$ are shown in Tables 7 and 8, respectively.

TABLE 7

Effect of 3rd Additive

| (wt %) | 0 | 0.005 | 0.01 | 0.03 | 0.05 | 0.2 | 0.3 |
|---|---|---|---|---|---|---|---|
| ZrO$_2$ | 260 | 250 | 190 | 150 | 120 | 150 | 290 |
| HfO$_2$ | 260 | 270 | 200 | 190 | 140 | 210 | 340 |
| Ta$_2$O$_5$ | 260 | 250 | 190 | 160 | 130 | 160 | 320 |
| Cr$_2$O$_3$ | 260 | 270 | 220 | 200 | 170 | 210 | 380 |
| MoO$_3$ | 260 | 270 | 230 | 200 | 190 | 220 | 400 |
| WO$_3$ | 260 | 260 | 220 | 190 | 180 | 200 | 370 |
| Al$_2$O$_3$ | 260 | 260 | 210 | 200 | 160 | 190 | 390 |
| Ga$_2$O$_3$ | 260 | 250 | 190 | 150 | 120 | 160 | 350 |
| In$_2$O$_3$ | 260 | 250 | 180 | 160 | 120 | 180 | 330 |
| GeO$_2$ | 260 | 240 | 190 | 150 | 110 | 150 | 340 |
| SnO$_2$ | 260 | 270 | 210 | 190 | 160 | 220 | 370 |
| Sb$_2$O$_3$ | 260 | 250 | 190 | 170 | 140 | 210 | 320 |
| Bi$_2$O$_3$ | 260 | 280 | 210 | 200 | 180 | 220 | 390 |

Main components: Fe$_2$O$_3$ 56.5 mol % MnO 39.5 mol % ZnO 4 mol %; subcomponents: CaO 0.1 wt % SiO$_2$ 0.02 wt %; sintering condition: A.

TABLE 8

Effect of 3rd Additive

| (wt %) | 0 | 0.005 | 0.01 | 0.1 | 0.2 | 0.5 | 0.6 |
|---|---|---|---|---|---|---|---|
| ZrO$_2$ | 270 | 260 | 180 | 160 | 120 | 160 | 280 |
| HfO$_2$ | 270 | 250 | 210 | 180 | 130 | 200 | 350 |
| Ta$_2$O$_5$ | 270 | 260 | 180 | 170 | 120 | 170 | 320 |
| Cr$_2$O$_3$ | 270 | 280 | 220 | 210 | 160 | 220 | 390 |
| MoO$_3$ | 270 | 260 | 240 | 160 | 180 | 210 | 420 |
| WO$_3$ | 270 | 250 | 230 | 190 | 170 | 200 | 380 |
| Al$_2$O$_3$ | 270 | 270 | 220 | 200 | 150 | 190 | 380 |
| Ga$_2$O$_3$ | 270 | 250 | 180 | 170 | 130 | 170 | 360 |
| In$_2$O$_3$ | 270 | 270 | 190 | 140 | 160 | 190 | 370 |
| GeO$_2$ | 270 | 250 | 180 | 140 | 100 | 160 | 330 |
| SnO$_2$ | 270 | 260 | 220 | 190 | 170 | 230 | 380 |
| Sb$_2$O$_3$ | 270 | 260 | 190 | 180 | 190 | 220 | 340 |
| Bi$_2$O$_3$ | 270 | 270 | 200 | 190 | 160 | 240 | 380 |

Main components: Fe$_2$O$_3$ 65.5 mol % MnO 17.5 mol % ZnO 17 mol %; subcomponents: CaO 0.1 wt % SiO$_2$ 0.02 wt %; sintering condition: A.

As is shown in Table 7, in the sintered substances including 56.5 mol % of Fe$_2$O$_3$, those including ZrO$_2$, HfO$_2$, Ta$_2$O$_5$, Cr$_2$O$_3$, MoO$_3$, WO$_3$, Al$_2$O$_3$, Ga$_2$O$_3$, In$_2$O$_3$, GeO$_2$, SnO$_2$, Sb$_2$O$_3$ or Bi$_2$O$_3$ each in a range of 0.01 to 0.2 wt % have a lower magnetic loss than those including only CaO and SiO$_2$ as the sub-components. The sintered substance having the minimum magnetic loss is one containing 0.05 wt % of GeO$_2$, which has a magnetic loss of as low as 110 kW/m$^3$.

As is shown in Table 8, in the sintered substances including 65.5 mol % of Fe$_2$O$_3$, those including the third additives each in a range of 0.01 wt % or more and 0.5 wt % or less have a lower magnetic loss than those including only CaO and SiO$_2$ as the sub-components. The sintered substance having the minimum magnetic loss is one containing 0.2 wt % of GeO$_2$, which has a magnetic loss of as low as 100 kW/m$^3$.

Next, a profile in the direction of depth from a broken-out section of each of the added metal elements was measured by using samples having the minimum magnetic loss (i.e., those including the third additives by 0.05 to 0.2 wt %) in the same manner as in Example 2. The results showed, in all of the samples, the concentration of the added metal elements was highest in the grain boundary, was decreased as the distance from the grain boundary was increased, and remained almost constant when the distance was about several tens of nm or more. In all samples, the concentration in the grain boundary was about 10 to several tens of times as high as that in the inside of a granule.

Example 6

Powder of Fe$_2$O$_3$, MnO and ZnO was respectively weighed so as to make a total weight to be 300 g in a composition ratio of 57 mol % of Fe$_2$O$_3$, 4 mol % of ZnO and 39 mol % of MnO in the same manner as in Example 1. CaCO$_3$, SiO$_2$ and Ta$_2$O$_5$ were added thereto so that the resulting mixture contained 0.1 wt % of CaO, 0.02 wt % of SiO$_2$ and 0.05 wt % of Ta$_2$O$_5$. The powder was mixed and wet-ground for 10 hours by a ball mill, and then dried. The mixed powder was calcined in air for 2 hours at 800° to 1200° C. Then, the resulting powder was again mixed and wet-ground for 10 to 20 hours by a ball mill, and dried.

Figure 1B:
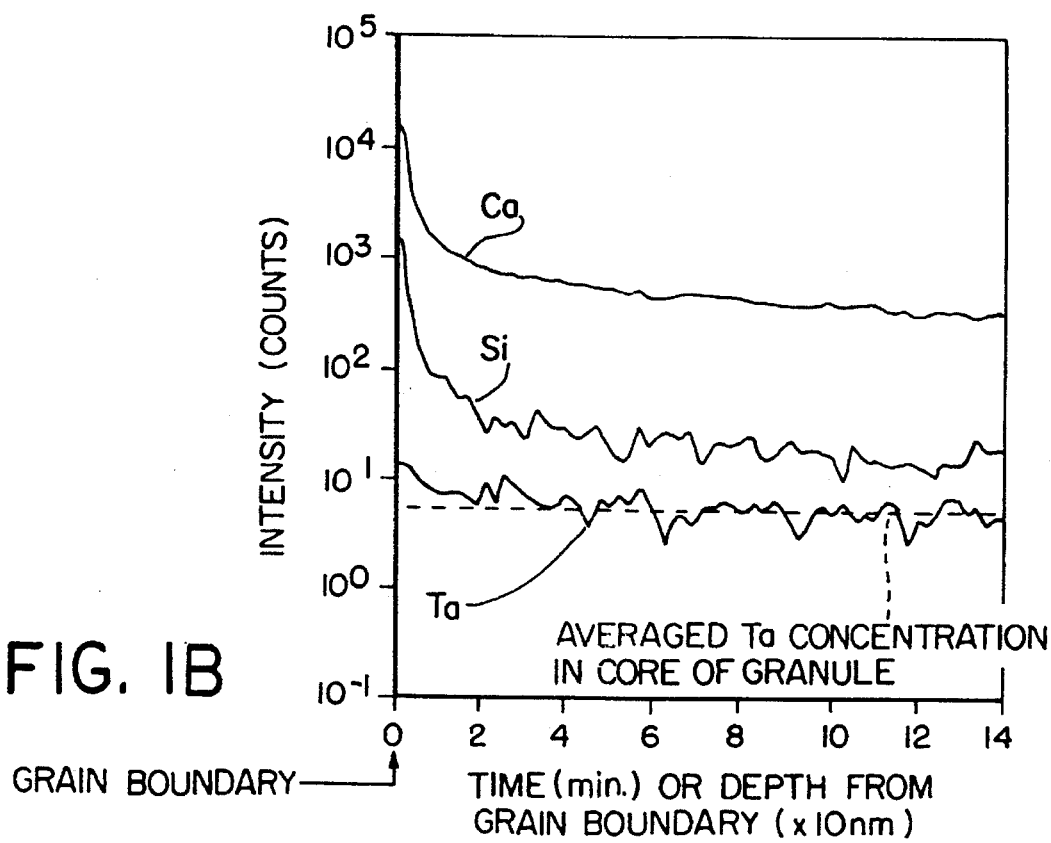

Ten wt % of an aqueous solution including 5 wt % of polyvinyl alcohol was added to the calcined powder. The resultant mixture was allowed to pass through a 30 mesh screen to obtain uniform granules. This powder was molded by using a uniaxial molding to give compact bodies. The resulting compact bodies were heated in air at 1200° C. for 5 hours under the same condition as in Example 1 to obtain sintered substances. Samples were obtained in the same manner as in Example 1 except that Ta$_2$O$_5$ was added when grinding the powder after the calcination. A ring-shaped sample obtained from each of the sintered substances was measured for the magnetic loss and the bottom temperature of a magnetic loss in the same manner as in Example 1. As a result, all samples showed the minimum magnetic loss at 80° C. Moreover, a broken-out section of each sintered substance was observed by an electron microscope to measure the average grain size of the sintered substance. Further, the Ta concentrations in the grain boundary and in the inside of the granule were measured in the same manner as in Example 2 to calculate a ratio of the concentration in the grain boundary to that inside granule. Examples of the sub-component concentration measurement are shown in FIGS. 1A and 1B. FIG. 1A shows the result obtained with a sample having a grain boundary/inside concentration ratio of Ta greater than 5, and FIG. 1B shows a result obtained with a sample having the concentration of Ta smaller than 5. The abscissa of the graph represents the depth from the grain boundary and the ordinate represents a metal oxide concentration. The results are shown in Table 9.

TABLE 9

Effect of Ta concentration ratio

| No | Ta addition | Calcination °C. | Sinter °C. | Molding Kg/cm | Density g/cm³ | Grain Size μm | Magnetic Loss kW/m³ | | Ta Conc. Ratio[1] |
|---|---|---|---|---|---|---|---|---|---|
| 1 | Non[2] | 900 | 1200 | 500 | 4.70 | 4 | 220 | —[5] | — |
| 2 | Before[3] | 900 | 1200 | 500 | 4.72 | 4 | 100 | *[6] | >10 |
| 3 | " | 1000 | 1200 | 500 | 4.67 | 4 | 130 | * | 9 |
| 4 | " | 1100 | 1200 | 500 | 4.62 | 5 | 160 | * | 5 |
| 5 | " | 1200 | 1200 | 500 | 4.55 | 5 | 290 | — | 3 |
| 6 | " | 1200 | 1200 | 1500 | 4.61 | 5 | 260 | — | 3 |
| 7 | After[4] | 900 | 1200 | 500 | 4.68 | 4 | 110 | * | >10 |
| 8 | " | 1000 | 1200 | 500 | 4.64 | 4 | 120 | * | >10 |
| 9 | " | 1100 | 1200 | 500 | 4.60 | 5 | 140 | * | >10 |
| 10 | " | 1200 | 1200 | 500 | 4.53 | 4 | 180 | * | >10 |

[1](Ta concentration at grain boundary)/(Ta concentration at inside of granule)
[2]Control: Ta is not added.
[3]Ta is added before calcination.
[4]Ta is added after calcination.
[5]—: Magnetic loss is greater than 200 kW/m³.
*: Magnetic loss is less than 200 kW/m³.
Main components: $Fe_2O_3$ 57 mol %  MnO 39 mol %  ZnO 4 mol %;
subcomponents: CaO 0.1 wt %  $SiO_2$ 0.02 wt %  $Ta_2O_5$ 0.05 wt %;
sintering condition: A.

As is evident from Table 9, addition of $Ta_2O_5$ decreases the magnetic loss. But the effect is largely degraded when the ratio of the Ta concentration in the grain boundary to that in the inside of a grain is 5 or less. Moreover, a sintered substance with a density of less than 4.6 g/cm³ (Sample 10 in Table 9) has a slightly larger magnetic loss as compared with other samples 7 through 9, although the ratio of the concentration is over 5. Moreover, the same effect is obtained regardless of whether Ta was added before or after the calcination.

Example 7

Samples were produced by adding Ta before or after calcination in the same manner and in the same composition as in Example 6 except that the composition of the main components were 65 mol % of $Fe_2O_3$, 22 mol % of MnO and 13 mol % of ZnO. A ring-shaped sample obtained from each of the resulting sintered substances was measured for the magnetic loss and the bottom temperature of a magnetic loss in the same manner as in Example 1. As a result, all samples showed the minimum magnetic loss at 80° C. An average grain size of the sintered substance was measured by observing the broken-out sections of the sintered substances with an electron microscope. Moreover, the Ta concentrations in the grain boundary and in the inside of the grain were measured in the same manner as in Example 2 to calculate a ratio of the concentration in the grain boundary to that in the inside of the grain. The results are shown in Table 10.

TABLE 10

Effect of Ta concentration ratio

| No | Ta addition | Calcination °C. | Sinter °C. | Molding Kg/cm | Density g/cm³ | Grain Size μm | Magnetic Loss kW/m³ | | Ta Conc. Ratio[1] |
|---|---|---|---|---|---|---|---|---|---|
| 1 | Non[2] | 900 | 1200 | 500 | 4.65 | 4 | 250 | —[5] | — |
| 2 | Before 3) | 900 | 1200 | 500 | 4.70 | 4 | 120 | *[6] | >10 |
| 3 | " | 1000 | 1200 | 500 | 4.68 | 4 | 150 | * | 9 |
| 4 | " | 1100 | 1200 | 500 | 4.65 | 5 | 170 | * | 5 |
| 5 | " | 1200 | 1200 | 500 | 4.57 | 5 | 310 | — | 3 |
| 6 | " | 1200 | 1200 | 1500 | 4.62 | 5 | 320 | — | 3 |
| 7 | After[4] | 900 | 1200 | 500 | 4.65 | 4 | 150 | * | >10 |
| 8 | " | 1000 | 1200 | 500 | 4.61 | 4 | 130 | * | >10 |
| 9 | " | 1100 | 1200 | 500 | 4.65 | 5 | 140 | * | >10 |
| 10 | " | 1200 | 1200 | 500 | 4.45 | 4 | 200 | * | >10 |

[1](Ta concentration at grain boundary)/(Ta concentration at inside of granule)
[2]Control: Ta is not added.
[3]Ta is added before calcination.
[4]Ta is added after calcination.
[5]—: Magnetic loss is greater than 200 kW/m³.
*: Magnetic loss is less than 200 kW/m³.
Main components: $Fe_2O_3$ 65 mol %  MnO 22 mol %  ZnO 13 mol %;
subcomponents: CaO 0.1 wt %  $SiO_2$ 0.02 wt %  $Ta_2O_5$ 0.05 wt %;
sintering condition: A.

As is evident from Table 10, addition of $Ta_2O_5$ decreases The magnetic loss. But the effect is largely degraded when the ratio of the Ta concentration in the grain boundary to that in the inside of the grain is 5 or less. Moreover, a sintered substance with a density of less than 4.6 g/cm³ (Sample 10 in Table 10) has a slightly larger magnetic loss as compared with other samples 7 through 9 although the ratio of the concentration is over 5. Moreover, The same effect is obtained regardless whether Ta was added before or after calcination.

Example 8

A sintered substance (e) was made under Condition A of Example 1 by using mixed powder in a composition of 57 mol % of $Fe_2O_3$, 39 mol % of MnO, 4 mol % of ZnO, 0.1 wt % of CaO, 0.02 wt % of $SiO_2$ and 0.05 wt % of $GeO_2$.

A sintered substance (f) was made under Condition B of Example 1 by using mixed powder in a composition of 55 mol % of $Fe_2O_3$, 39 mol % of MnO, 6 mol % of ZnO, 0.1 wt % of CaO, 0.02 wt % of $SiO_2$ and 0.05 wt % of $GeO_2$.

A sintered substance (g) was made under Condition A of Example 1 by using mixed powder in a composition of 64 mol % of $Fe_2O_3$, 21 mol % of MnO, 15 mol % of ZnO, 0.1 wt % of CaO, 0.02 wt % of $SiO_2$ and 0.05 wt % of $GeO_2$.

A sintered substance (h) was made under Condition A of Example 1 by using mixed powder in a composition of 64 mol % of $Fe_2O_3$, 16 mol % of MnO, 21 mol % of ZnO, 0.1 wt % of CaO, 0.02 wt % of $SiO_2$ and 0.05 wt % of $GeO_2$.

A sintered substance (i) was made under Condition B of Example 1 by using mixed powder in a composition of 52 mol % of $Fe_2O_3$, 38 mol % of MnO, 10 mol % of ZnO, 0.1 wt % of CaO, 0.02 wt % of $SiO_2$ and 0.05 wt % of $GeO_2$.

These sintered substances (e) through (i) were measured for the magnetic loss in the same manner and under the same conditions as in Example 1.

The sintered substance (e) had a density of 4.71 g/cm³ and a minimum magnetic loss of 130 kW/m³ at a temperature of 80° C. The sintered substance (f) had a density of 4.39 g/cm³ and a minimum magnetic loss of 210 kW/m³ at a temperature of 60° C. The sintered substance (g) had a density of 4.63 g/cm³ and a minimum magnetic loss of 100 kW/m³ at a temperature of 80° C. The sintered substance (h) had a density of 4.59 g/cm³ and a minimum magnetic loss of 230 kW/m³ at a temperature of 100° C. In this manner, the sintered substances (e) through (h) have compositions preferred in the present invention and are materials having a low magnetic loss.

On the contrary, the sintered substance (i), which has a composition out of the preferred range of the present invention, has a density of 4.41 g/cm³, and has a minimum magnetic loss of 850 kW/m³ at a temperature of 60° C.

Each of the five sintered substances was measured for its magnetic loss at its bottom temperature of a magnetic loss under the condition that a product of a magnetic flux density B and a frequency f (B·f) was constantly 50 mT·MHz. (Under this condition, power supply inverters with the same output have a fixed core size.) The results are shown in Table 11.

TABLE 11

| Magnetic Loss vs. Frequency | | | | | | |
|---|---|---|---|---|---|---|
| Magnetic Flux | Frequency | Magnetic Loss (kW/m³) | | | | |
| (mT) | (MHz) | e | f | g | h | i |
| 250 | 0.2 | 6930 | 6400 | 7050 | 6700 | 2520 |
| 167 | 0.3 | 1030 | 1290 | 1070 | 1270 | 1360 |
| 100 | 0.5 | 400 | 550 | 380 | 480 | 910 |
| 50 | 1 | 130 | 210 | 100 | 230 | 850 |
| 25 | 2 | 130 | 220 | 140 | 200 | 1070 |
| 10 | 5 | 260 | 300 | 280 | 320 | 1190 |
| 5 | 10 | 540 | 790 | 560 | 830 | — |

As is evident from Table 11, the sintered substances (e) through (i) showed the minimum magnetic loss at around a frequency of 0.5 to 2 MHz. Comparing the sintered substances (e) through (h) with the sintered substance (i), the former, having the composition preferred in the present invention, are effective in a frequency band of 300 kHz or more. However, at 10 MHz, even these sintered substances show increased magnetic loss.

Next, an E-shaped core was cut out from each of the sintered substances. A forward type switching power supply circuit (shown in FIG. 2) was fabricated by using the E-shaped core. A rise of the temperature due to the magnetic loss was evaluated. The temperature rise in a magnetic core against frequency and magnetic flux density was measured under a determined low-load condition. The results are shown in Table 12.

TABLE 12

| Emission of Heat vs. frequency | | | | | | |
|---|---|---|---|---|---|---|
| Frequency | Magnetic Flux | Increase in Temperature (°C.) | | | | |
| (MHz) | (mT) | e | f | g | h | i |
| 0.1 | 50 | 1 | 1 | 1 | 1 | 8 |
| 0.2 | 50 | 1 | 3 | 1 | 2 | 11 |
| 0.3 | 50 | — | 5 | — | 4 | 29 |
| 0.5 | 50 | 3 | 8 | 4 | 9 | 35 |
| 1.0 | 50 | 5 | 12 | 6 | 13 | 43 |
| 1.2 | 50 | 7 | 15 | 8 | 16 | 47 |
| 1.5 | 50 | 10 | 20 | 10 | 18 | — |
| 2.0 | 50 | 13 | 24 | 12 | 25 | — |
| 2.2 | 50 | 15 | 32 | 16 | 33 | — |
| 1.0 | 10 | 1 | 2 | 1 | 2 | 12 |
| 1.0 | 20 | 4 | 5 | 3 | 4 | 30 |
| 1.0 | 50 | 7 | — | 7 | — | — |
| 1.0 | 100 | 12 | 22 | 13 | 21 | — |

As is evident from Table 12, assuming that an allowable temperature rise due to a magnetic loss in the core of the inverter to be 25° C., the temperature is largely raised in the power supply using the sintered substance (i), and thus the sintered substance (i) can not be used at a high frequency. On the contrary, in the power supplies using the sintered substances (e) through (h) having the composition preferred in the present invention, the temperature rise is low. Therefore, they can be used at up to 2 MHz at 50 mT. This is because each of the used materials has a low magnetic loss and, simultaneously, a satisfactory bottom temperature of a magnetic loss. It can be estimated from the results shown in Table 11 that they would be able to be used around 5 MHz since such materials are generally used with a lower magnetic flux density at a higher frequency. A switching power supply of 2 MHz or more is not practical at the present time because a loss in the other parts of the circuit are increased at such a frequency, but such a circuit could be realized if the loss in the other elements is prevented.

As described in the above-mentioned examples, the power supply having a switching frequency of 100 kHz to 2 MHz using the ferrite material of the present invention emits slight heat, has a high efficiency and causes almost no thermorunaway. Moreover, its characteristics are remarkable especially at a frequency of 300 kHz or more, and such a power supply can be used at a frequency up to 5 MHz if the loss in the circuit can be avoided.

As described above, according to the composition of the present invention, a magnetic material having an excellent temperature characteristic for the magnetic loss and a low magnetic loss can be provided by adding at least a certain amount of CaO and $SiO_2$, and preferably adding a certain amount of $M_xO_z$ to a MnZn type ferrite having a particular main composition. The $M_xO_z$ is at least one selected from the group consisting of $ZrO_2$, $HfO_2$, $Ta_2O_5$, $Cr_2O_3$, $MoO_3$, $WO_3$, $Al_2O_3$, $Ga_2O_3$, $In_2O_3$, $GeO_2$, $SnO_2$, $Sb_2O_3$ and $Bi_2O_3$.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An oxide magnetic material which is a sintered substance consisting essentially of
   as main components, 55 to 59 mol % of $Fe_2O_3$; 35 to 42 mol % of MnO; and 6 mol % or less of ZnO;
   as sub-components, 0.05 to 0.3 wt % of CaO; 0.005 to 0.05 wt % of $SiO_2$; and 0.01 to 0.2 wt % of at least one kind of a metallic oxide selected from the group consisting of $ZrO_2$, $Ta_2O_5$, $MoO_3$, $In_2O_3$, $Sb_2O_3$ and $Bi_2O_3$.

2. An oxide magnetic material according to claim 1, wherein an average grain size of a grain constituting the oxide magnetic material is 10 µm or less.

3. An oxide magnetic material according to claim 1, wherein an average grain size of a grain constituting the oxide magnetic material is 2 to 5 µm.

4. An oxide magnetic material according to claim 1, wherein a density of the oxide magnetic material is 4.6 g/cm³ or more.

5. A switching power supply with a switching frequency of 300 kHz to 5 MHz comprising a converter having a magnetic core comprising the oxide magnetic material according to claim 1.

6. An oxide magnetic material which is a sintered substance consisting essentially of
   as main components, 62 to 66 mol % of $Fe_2O_3$; 14 to 28 mol % of MnO; and 10 to 20 mol % of ZnO;
   as sub-components, 0.05 to 0.5 wt % of CaO; 0.005 to 0.2 wt % of $SiO_2$; and 0.01 to 0.5 wt % of at least one kind of a metallic oxide selected from the group consisting of $ZrO_2$, $HfO_2$, $Ta_2O_5$, $MoO_3$, $Ga_2O_3$, $In_2O_3$, $Sb_2O_3$ and $Bi_2O_3$.

7. An oxide magnetic material according to claim 6, wherein an average grain size of a grain constituting the oxide magnetic material is 10 µm or less.

8. An oxide magnetic material according to claim 6, wherein an average grain size of a grain constituting the oxide magnetic material is 2 to 5 µm.

9. An oxide magnetic material according to claim 6, wherein a density of the oxide magnetic material is 4.6 g/cm³ or more.

10. A switching power supply with a switching frequency of 300 kHz to 5 MHz comprising a converter having a magnetic core comprising the oxide magnetic material according to claim 6.

* * * * *

UNITED STATES PATENT AND TRADEMARK OFFICE
CERTIFICATE OF CORRECTION

PATENT NO. : 5,518,642
DATED : May 21, 1996
INVENTOR(S) : Osamu Inoue et al

It is certified that error appears in the above-indentified patent and that said Letters Patent is hereby corrected as shown below:

On the title page, item [73], change "Kadomi" to --Kadoma-shi--.

Signed and Sealed this

Thirteenth Day of May, 1997

Attest:

BRUCE LEHMAN

Attesting Officer       Commissioner of Patents and Trademarks